Figure 1:
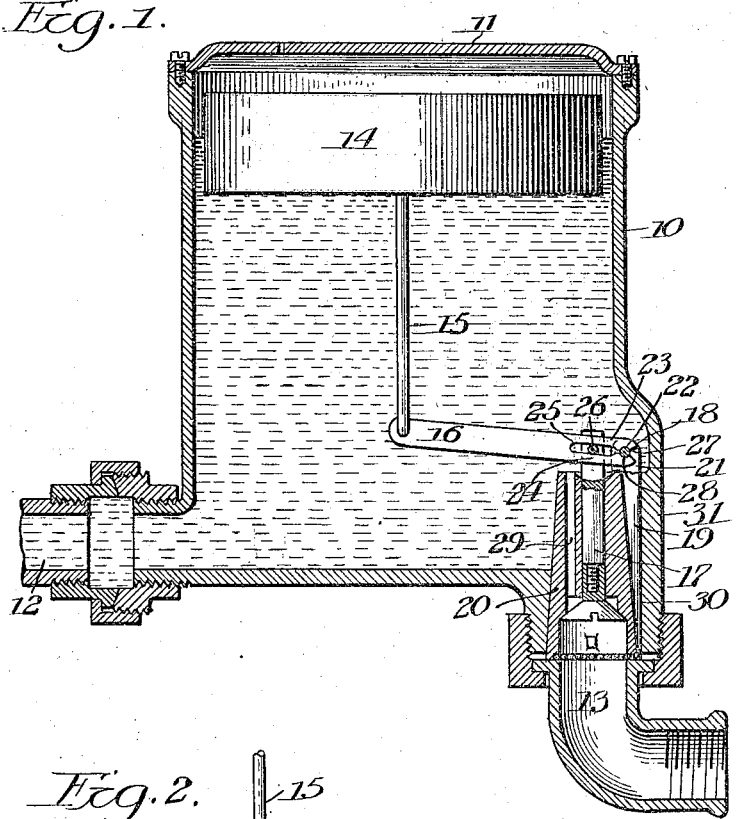

June 24, 1924.　　　　　O. C. HARRIS　　　　　1,498,726

VALVE

Filed Sept. 30, 1921

Inventor
Omar C. Harris
by Otto M. Wernich
Atty

Patented June 24, 1924.

1,498,726

UNITED STATES PATENT OFFICE.

OMAR C. HARRIS, OF CHICAGO, ILLINOIS.

VALVE.

Application filed September 30, 1921. Serial No. 504,464.

*To all whom it may concern:*

Be it known that I, OMAR C. HARRIS, a citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

The invention relates to valves and primarily to the lever type, in which the lever is connected to a valve and also to some suitable prime mover such as a float, the lever being actuated to open or close the valve upon the movement of the float, the latter being controlled by the liquid level in the casing which houses the float.

The invention has as one of its principal objects the provision of a connection between the lever and its pivot whereby the former may be disconnected from its association with the pivot and be arranged so that it is permitted to be passed through a comparatively small opening in the valve casing and then be arranged and connected to the pivot after its insertion within the casing, or may be disconnected from its connection with the pivot to allow the lever to be arranged and withdrawn from the casing through said opening.

It is an object to provide an element which may be readily associated and removed from the casing, which will provide a tight or leakproof connection and eliminate threads, etc., for holding it with respect to the casing and which is provided with fluid passages and a valve for controlling said passages. This element is provided with a rib which prevents rotation of the element with respect to the casing, and is also provided with a part which cooperates with the lever to produce the pivot with which said lever may be readily associated and disconnected to accomplish the desired end.

In addition it is an object to provide the lever with a means whereby it may be connected and disconnected to and from the means provided upon the above referred to element, without the aid of any tools to accomplish this result.

In the embodiment of the invention illustrated in the drawings the element which is designed to be inserted and removed from its association with the valve casing, is of a tapered construction which is inserted into a similarly shaped aperture in the casing. This tapered formation prevents leakage between the element and the casing and eliminates screw threads, etc., for holding it in place and provides the necessary tight connection between the parts. This element is provided with a longitudinally disposed rib which fits into a correspondingly shaped opening in the casing and this rib projects beyond the end of the element and is provided with a pin which when the lever is associated therewith provides a pivot for the lever. The end of the lever adjacent the pin is bifurcated to produce spring fingers which resiliently engage the pin and permit the lever to be held and readily disconnected from the pin. The bifurcated end of the lever also provides a slot for the reception of a connection between the lever and the stem of the valve which as before stated, is carried by the element which is removably associated with the valve casing. The end of the valve stem is slotted to allow the lever to be arranged in a vertical position or in alignment with the stem, after said lever has been disconnected from the pin carried by the plug or tapered element. When the lever is arranged in this last named position this allows the plug, lever and associated elements to be inserted and removed from within the casing. The invention will be explained and more readily understood when read in conjunction with the accompanying drawings which illustrate one embodiment of the invention, it being understood that changes and modifications may be resorted to without departing from the spirit of the appended claims forming a part hereof.

Figure 2:
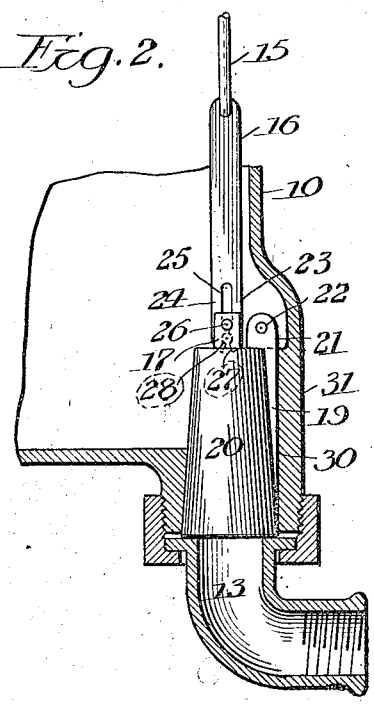

In the drawings Figure 1 is a central section of a valve constructed according to one embodiment of the invention;

Fig. 2 is an elevation showing certain parts in the position which they will assume when arranged for removal or insertion within the casing.

The structure forming the basis of the application is illustrated as arranged at the outlet of the float chamber. However, it may be arranged at any other desired position, as for instance, the inlet to said chamber. The float chamber 10 is provided with a cover 11, an inlet 12, and an outlet 13. A float 14 is arranged within the casing 10 and has a rod 15 extending therefrom which has one end connected to the lever 16. The opposite end of this lever 16 is pivotally secured to the end of the valve stem 17, and has its extreme end pivotally secured at 18 to the extending extremity of the rib 19 which is integral with the removable plug 20. This end of the rib 19 is bifurcated as at 21 and is provided with a pin 22 with which the end of the lever is connected to provide a pivot therefor. This end of the lever 16 adjacent the plug is bifurcated to produce the parallel resilient arms 23 and 24 and the slot 25, the latter being provided for the reception of the pin 26 arranged at the uppermost extremity of the valve stem 17. The extremities of the arms 23 and 24 are beveled as at 27 and the end of the lever adjacent the beveled portions is provided with the curved portions 28 which surround the pin 18 and cooperate therewith to produce the pivot for this lever 16. The slot 25 terminates adjacent the curved portions 28 which define one end of the slot 25. This arrangement just described which includes the resilient arms 23 and 24 and the slot 25 allows the arm 16 to be associated with and disconnected from the pin 22 and allows the lever to be arranged in alignment with the valve stem 17 and the plug, which thus permits the plug and lever to be removed from or inserted into the casing as a unit, when this is found necessary.

This plug is provided with fluid passages 29 which are controlled by the valve carried by the stem 17, and as before stated, the plug is also provided with the rib 19 which is arranged in a correspondingly shaped groove 30 in the offset portion 31 of the casing. This insures against rotation of the plug and the maintenance of the other elements connected to the plug in their proper position. The plug may be held within the aperture provided for its reception by means of a nut and other connections such as illustrated.

From the foregoing description of the structure forming the connection between the valve lever 16 and the pin 22 it is obvious that the lever may be easily associated with and disconnected from the pin, yet securely held with relation to the pin and may be arranged relatively to the plug to allow the entire structure including the lever, the rod which secures the lever to the float and the plug to be removed and associated as a unit with relation to the casing.

Having described the invention, what I claim and desire to cover by Letters Patent is:

1. In a device of the class described, the combination of a valve, a lever for actuating the valve, a pivotal connection for said lever, said connection including a resilient portion permitting said pivotal connection to be formed and disconnected.

2. In a device of the class described, the combination of a valve, a lever for actuating the valve, a pivotal connection for said lever, said connection including a bifurcated resilient portion permitting said pivotal connection to be formed and disconnected.

3. In a device of the class described, the combination of a valve, a lever for actuating the valve, a pivotal connection for said lever, said connection including a bifurcated resilient portion and a pin permitting said pivotal connection to be formed and disconnected.

4. In a device of the class described, the combination of a valve having a stem, a lever for actuating the valve, a connection between said lever and said valve stem, said connection permitting the lever to be arranged in substantial alignment with said valve stem, a pivot for said lever, said lever having a resilient portion whereby it may be connected and disconnected relatively to said pivot.

5. In a device of the class described, the combination of a valve having a stem, a lever for actuating the valve, a connection between said valve stem and lever, said connection permitting the lever to be arranged in substantial alignment with said valve stem and transversely thereto, a member having means cooperating with the lever to provide a pivot for said lever when said lever is arranged transversely to the valve stem, said lever having resilient means permitting said lever to be separably connected with said first mentioned means.

6. In a device of the class described, the combination of a casing, a plug removably associated with said casing, said plug and casing having a cooperating rib and groove to prevent rotation of the plug relatively to the casing, passages provided in said plug, a valve controlling said passages, said valve having a stem, a lever, a connection between the lever and stem permitting the lever to be arranged in substantial alignment with the stem and permitting the lever to be arranged transversely to the stem, means provided upon said rib cooperating with the lever to provide a pivot for the lever when said lever is arranged transversely to the valve stem, said lever having resilient means permitting said lever to be separably connected with said first mentioned means.

In witness whereof, I hereunto subscribe my name this 29th day of August, A. D. 1921.

OMAR C. HARRIS.